(12) United States Patent
Roberts et al.

(10) Patent No.: US 7,021,694 B1
(45) Date of Patent: Apr. 4, 2006

(54) VEHICLE TENT ASSEMBLY

(76) Inventors: Steve N. Roberts, 1008 West Valerio St., Santa Barbara, CA (US) 93101; Nicholas L. Measures, 1193 Winthrop La., Ventura, CA (US) 93001

( * ) Notice: Subject to any disclaimer, the term of this patent is extended or adjusted under 35 U.S.C. 154(b) by 0 days.

(21) Appl. No.: 11/100,933

(22) Filed: Apr. 8, 2005

(51) Int. Cl.
*B60P 7/04* (2006.01)

(52) U.S. Cl. .............. 296/100.18; 296/159; 296/164; 5/118; 5/708; 5/902; 135/88.13

(58) Field of Classification Search ............. 296/156, 296/159, 161, 162, 164, 167, 100.15, 100.18, 296/100.16; 5/118, 706, 902; 135/88.13, 135/121, 122
See application file for complete search history.

(56) References Cited

U.S. PATENT DOCUMENTS

| | | | |
|---|---|---|---|
| 2,151,908 A * | 3/1939 | Gottlieb | 135/136 |
| 4,005,898 A | 2/1977 | Way | |
| 4,332,265 A * | 6/1982 | Baker | 296/159 |
| 4,968,085 A * | 11/1990 | Stann | 296/100.16 |
| 5,167,246 A * | 12/1992 | Mortenson | 135/153 |
| 5,193,877 A * | 3/1993 | George, Jr. | 296/136.1 |
| D340,689 S | 10/1993 | Wolcott et al. | |
| 5,299,849 A | 4/1994 | Cook et al. | |
| 5,353,826 A | 10/1994 | Davis, Sr. | |
| 5,544,671 A | 8/1996 | Phillips | |
| 5,711,337 A * | 1/1998 | McKenney | 135/121 |
| 5,957,525 A | 9/1999 | Nelson | |
| 5,966,755 A | 10/1999 | Pittman | |
| 6,230,340 B1 | 5/2001 | Edwards | |
| 6,481,784 B1 | 11/2002 | Cargill | |
| 6,505,879 B1 * | 1/2003 | Arviso | 296/100.18 |
| 6,616,212 B1 * | 9/2003 | Bishop | 296/100.18 |
| 6,824,192 B1 * | 11/2004 | Hoffmann | 296/100.18 |
| 6,942,279 B1 * | 9/2005 | Hoover | 296/100.18 |
| 2002/0083528 A1 * | 7/2002 | Fisher et al. | 5/706 |
| 2004/0035454 A1 * | 2/2004 | Tseng | 135/121 |
| 2005/0120477 A1 * | 6/2005 | Kennan | 5/118 |

* cited by examiner

*Primary Examiner*—Jason Morrow

(57) ABSTRACT

A tent assembly includes an awning including a plurality of tubular support members having rectilinear longitudinal lengths and a plurality of couplings for interchangeably conjoining the tubular support members such that the tubular support members define a rigid frame. The tent assembly further includes a mechanism for removably securing the frame to a support surface and a canvas removably positional over the frame for preventing undesirable foreign debris from entering beneath the frame. An inflatable mattress is sized and shaped for nesting on the flat bed of the flat bed truck. The tent assembly further includes a mechanism for selectively inflating the mattress such that a user can introduce and displace air from the mattress as needed during periodic use. The inflating mechanism is detachably engageable with the inlet port and includes one implement selected from the group including a manual air-pump and an electrically powered air-pump.

18 Claims, 5 Drawing Sheets

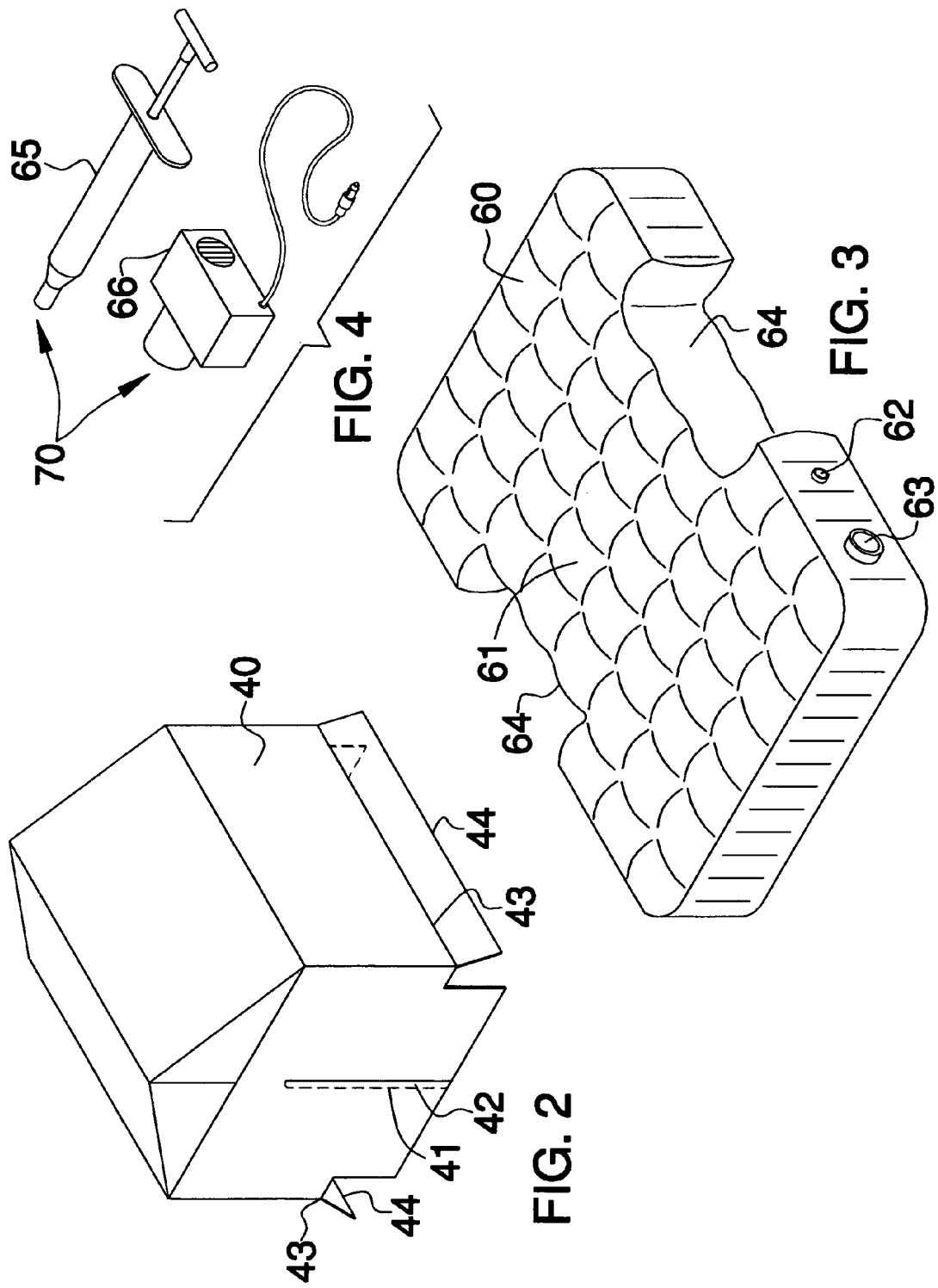

VEHICLE TENT ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a tent assembly and, more particularly, to a vehicle tent assembly for use on a flat bed truck.

2. Prior Art

Typically, pickup trucks and other vehicles are sold and used with the decks of the beds exposed to the exterior environment. During adverse weather conditions, it would not be wise to transport some types of cargo, in the open bed of the pickup truck because damage to the cargo might occur. For this reason, some vehicles and trailers have enclosed compartments for the transport of cargo. While this is effective in protecting the cargo, such construction defeats the versatility of a pickup truck. Accordingly, one solution to the problem of protecting cargo transported by a pickup truck is to cover the cargo with a tarp.

However, when driving the pickup truck, wind causes these tarps to flutter. Not only is this annoying to the occupants of the pickup truck, but also the tarp could potentially disengage from the pickup truck. By making modifications to the pickup truck, tie-down fasteners can be used to better secure the tarp in a manner to limit the amount of the flutter. Also, hard-shell tops could be installed over the opened bed to protect the cargo from adverse weather conditions but, as mentioned below, these have inherent disadvantages.

In addition to transporting cargo, pickup trucks are also used for recreational activities such as camping. It should be understood that a vehicle mounted tent can sometimes be similar to a cargo protecting covering, except that a tent structure employs an integrated framework in conjunction with the vehicle bed in order to form a protected space of size suitable for temporary occupancy and shelter. Many pickup truck owners who enjoy camping have converted their pickup trucks either temporarily or permanently to campers.

Several types of conversions are readily commercially available to pickup truck owners who desire to convert their pickup trucks to campers. A more permanent conversion would be a self-contained camper unit which is mounted into the bed of the pickup truck. Usually, these camper units come completely equipped with small appliances such as a sink, a propane stove, and a refrigerator, as well as two bunks and a toilet. Temporary conversions would include a hard-shell camper top or a tent structure to cover the bed of the pickup truck, thereby protecting the occupants from adverse weather conditions. These temporary conversions are more desirable if the pickup truck is required for work-related or other uses.

The hard-shell camper top has inherent disadvantages. The hard-shell camper top is heavy. This causes hardship in mounting it to and dismounting it from the bed of the pickup truck. Extreme care must be taken when mounting the hard-shell camper shell on the bed of the pickup truck. If improperly mounted, the camper shell could detach from the pickup truck. If the pickup truck is in motion at the time when the camper shell detaches, the camper shell could cause bodily harm and property damage. Further, transporting a heavy hard-shell camper top reduces fuel economy of the truck and, therefore, a cost penalty is associated with employing one. The hard-shell camper top is bulky and, as a result, storing it presents an inconvenience problem and a storage space problem. Lastly, it is simply not very practical to remove the camper shell from the truck unless it would be near its place of storage.

To overcome the inherent disadvantages of employing a hard-shell camper top, many types of tent structures for pickup trucks have been developed. One tent arrangement for a pickup truck utilizes a tailgate envelope which secures the tent to the lowered tailgate. Although this envelope extends the living space inside of the tent, it does require an occupant to either step or kneel on the envelope before entry into the tent. Stepping or kneeling on the envelope can damage the tent structure and subsequently decrease its useful life. This problem could be circumvented by providing a stairway leading to the entrance of the tent.

Other tent structures require assembling a frame comprising numerous elongated tubular elements. The frame is secured into the bed of the pickup truck by sliding a tubular element over spatially-disposed bed studs that are incorporated as fixtures into the bed of the pickup truck. Assembling these tubular elements consumes time and these bed-stud fixtures occupy space that otherwise could be more effectively used by the occupants. Modifications must be made to the pickup truck to facilitate the attachment of these fixtures.

Accordingly, a need remains for a tent assembly for a vehicle that overcomes the above-noted shortcomings. The present invention satisfies such a need by providing a tent assembly including an inflatable air mattress for use with a flat bed truck. Such an assembly provides a comfortable and protected place upon which a truck owner could rest or sleep overnight. It would also be particularly useful to campers, anglers, hunters, and other outdoor enthusiasts who may not want to pitch a tent on wet or uneven terrain.

BRIEF SUMMARY OF THE INVENTION

In view of the foregoing background, it is therefore an object of the present invention to provide a tent assembly mountable onto a flat bed truck. These and other objects, features, and advantages of the invention are provided by a tent assembly including an awning including a plurality of tubular support members having rectilinear longitudinal lengths and a plurality of couplings for interchangeably conjoining the tubular support members such that the tubular support members define a rigid frame. The frame has a triangular-shaped apex, and the canvas has an elongated slot formed therein. The slot includes a hook and loop mechanism for allowing a user to securely conjoin opposed portions of the canvas during sleeping conditions.

The tent assembly further includes a mechanism for removably securing the frame to a support surface such that the frame can be maintained at a substantially stable position during operating conditions and a canvas removably positional over the frame for preventing undesirable foreign debris from entering beneath the frame. The canvas is formed from fluid impermeable material and has a plurality of lines of weakness such that the canvas can be readily adapted in such a manner to conform to a shape of the frame. The canvas further has a plurality of lower flange portions extending along a longitudinal length thereof for directing the foreign debris outwardly and away from the frame.

An inflatable mattress is sized and shaped for nesting on the flat bed of the flat bed truck. The inflatable mattress has a corrugated top surface for providing resilient support and equalizing downward forces exerted thereon during sleeping conditions. The mattress includes an inlet port and an outlet port juxtaposed thereto and is provided with a pair of oppositely situated indentations monolithically formed therewith such that a pair of wheel wells can be seated therebetween during operating conditions.

The tent assembly further includes a mechanism for selectively inflating the mattress such that a user can introduce and displace air from the mattress as needed during periodic use. The inflating mechanism is detachably engageable with the inlet port and preferably includes one implement selected from the group including a manual air-pump and an electrically powered air- pump.

The securing mechanism preferably includes a plurality of annular brackets centrally secured to bottom end portions of selected ones of the tubular support members. The annular brackets have a pair of diametrically opposed openings formed therein for receiving fastening members therethrough.

In an alternate embodiment, a plurality of stakes may be integrally connected to bottom end portions of selected ones of the tubular support members. The stakes may have a converging outer surface terminating subjacent the tubular support member bottom end portions.

The couplings are preferably provided with surface indicia such that a user can quickly identify corresponding ones of the couplings during installation procedures and connect associated ones of the tubular support members thereto. Selected ones of the couplings have four axially opposed openings while other ones of the couplings have three obliquely offset openings. Selected ones of the tubular support members preferably include telescopically engageable male and female end portions for allowing a user to adjust a height of the frame by slidably adapting the selected tubular support members along an axial path.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a perspective view showing the canvas in a preferred environment;

FIG. 3 is a perspective view of the air mattress;

FIG. 4 is a perspective view of the inflating mechanism showing a manual air pump and an electric air pump;

DETAILED DESCRIPTION OF THE INVENTION

Figure 1A:
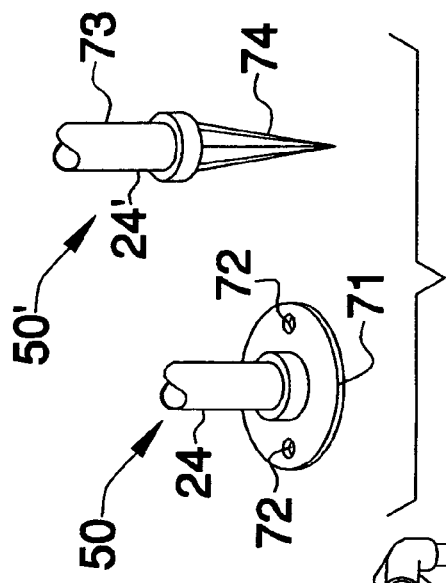
FIG. 1a is a perspective view showing the annular brackets and stakes.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

The apparatus of this invention is referred to generally in FIGS. 1–7 by the reference numeral 10 and is intended to provide a tent assembly mountable on a flat bed truck. It should be understood that the tent assembly 10 may be used to provide a covering for many different sizes and types of vehicles, and should not be limited in use to only flat bed trucks.

Initially referring to FIGS. 1, 2, 5, and 6, the tent assembly 10 includes an awning 20 including a plurality of tubular support members 21 having rectilinear longitudinal lengths and a plurality of couplings 22 for interchangeably conjoining the tubular support members 21 such that the tubular support members 21 define a rigid frame 30 having a triangular shaped apex. The awning 20 further includes a canvas 40 having an elongated slot 41 formed therein and being removably positional over the frame 30 for preventing foreign debris from entering beneath the frame. The slot 41 preferably includes a hook and loop mechanism 42, such as VELCRO for example and well known in the industry, for allowing a user to securely conjoin opposed portions of the canvas 40 during sleeping conditions. Of course, other fastening mechanisms such as a zipper, buttons, snaps, and ties may be used, as is obvious to one having ordinary skill in the art.

The tent assembly 10 further includes a mechanism 50 for removably securing the frame 30 to a support surface such that the frame 30 can be maintained at a substantially stable position during operating conditions. The canvas 40 is formed from fluid impermeable material and has a plurality of lines of weakness 43 such that the canvas 40 can be readily adapted in such a manner to conform to a shape of the frame 30. Such lines of weakness 43 enable the tent assembly 10 to fit trucks of different sizes without having to manufacture or produce different size versions. The canvas 40 further has a plurality of lower flange portions 44 extending along a longitudinal length thereof for directing the foreign debris outwardly and away from the frame 30. Inevitably, some road debris, dirt and dust is directed towards the bed of a truck during driving, and the flange portions 44 assist in preventing such items from accumulating inside the tent assembly 10.

Referring to FIG. 3, an inflatable mattress 60 is sized and shaped for nesting on the flat bed of the flat bed truck. The inflatable mattress 60 has a corrugated top surface 61 for providing resilient support and equalizing downward forces exerted thereon during sleeping conditions. Such a mattress 60 is preferably formed from rubber or vinyl material, but may be formed from any inflatable material, as is obvious to one having ordinary skill in the art. The mattress 60 includes an inlet port 62 and an outlet port 63 juxtaposed thereto and is provided with a pair of oppositely situated indentations 64 monolithically formed therewith such that a pair of wheel wells can be seated therebetween during operating conditions. Such indentations 64 ensure that the mattress 60 is easily positioned in the bed of a truck and remains substantially stable during transport from one location to another.

Referring to FIG. 4, the tent assembly 10 further includes a mechanism 70 for selectively inflating the mattress 60 such that a user can introduce and displace air from the mattress 60 as needed during periodic use. The inflating mechanism 70 is detachably engageable with the inlet port 62 and preferably includes one implement selected from the group including a manual air-pump 65 and an electrically powered air-pump 66. The electrically powered air-pump 66 may be operated via a power source such as a conventional 110 volt power source, or via a twelve-volt adapter as is commonly used with twelve volt electrical systems found in automotive and truck vehicles, as is obvious to one having ordinary skill in the art.

Referring to FIG. 1a, the securing mechanism 50 preferably includes a plurality of annular brackets 71 centrally secured to bottom end portions 24 of selected ones of the tubular support members 21. The annular brackets 71 have a pair of diametrically opposed openings 72 formed therein for receiving fastening members therethrough. In an alternate embodiment 50', a plurality of stakes 73 may be integrally connected to bottom end portions 24' of selected ones of the tubular support members. The stakes preferably have a converging outer surface 74 terminating subjacent the tubular support member bottom end portions 24'.

Figure 1:
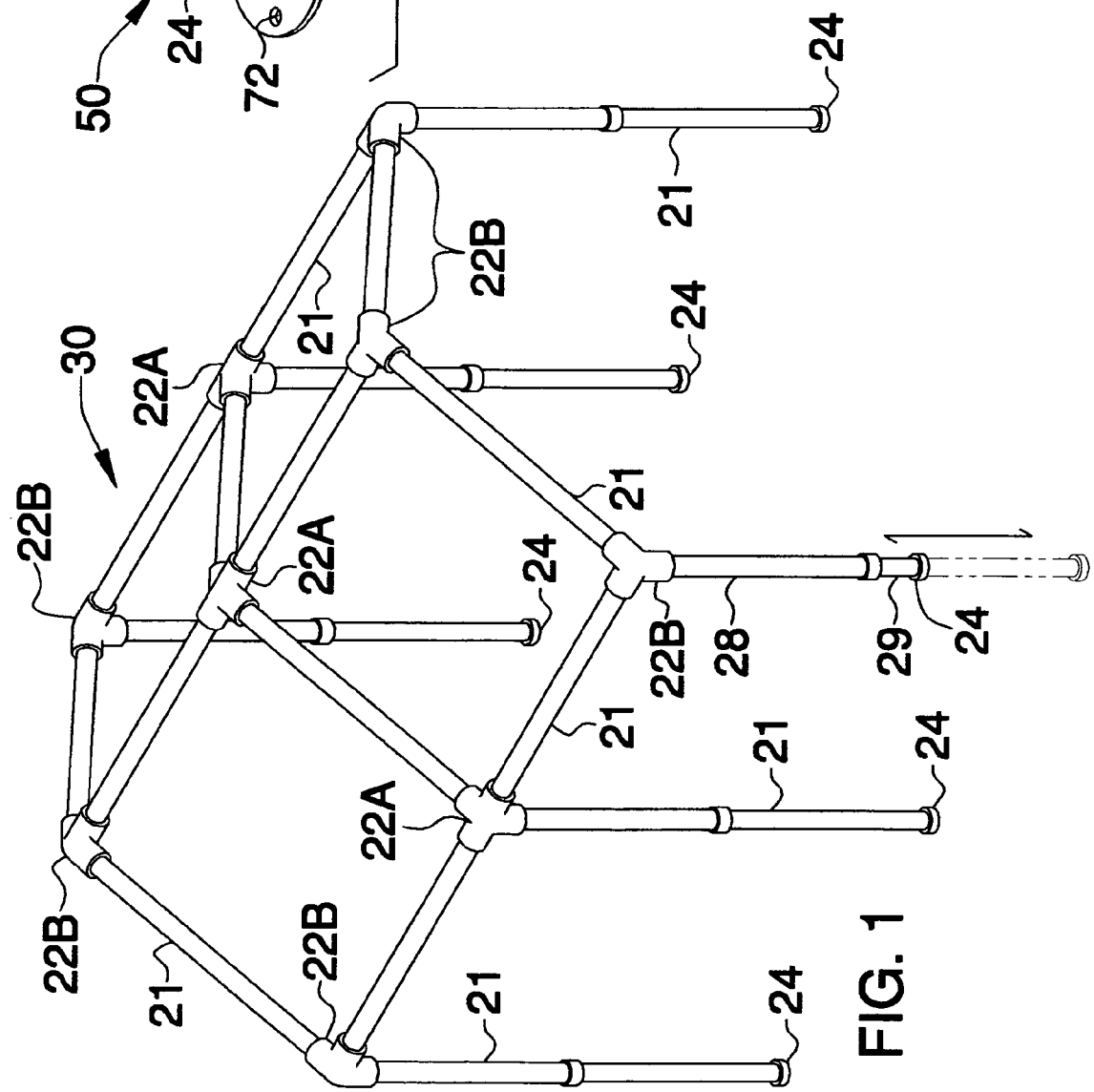
FIG. 1 is a perspective view of a tent assembly showing the tubular support members, in accordance with the present invention.
Figure 5:
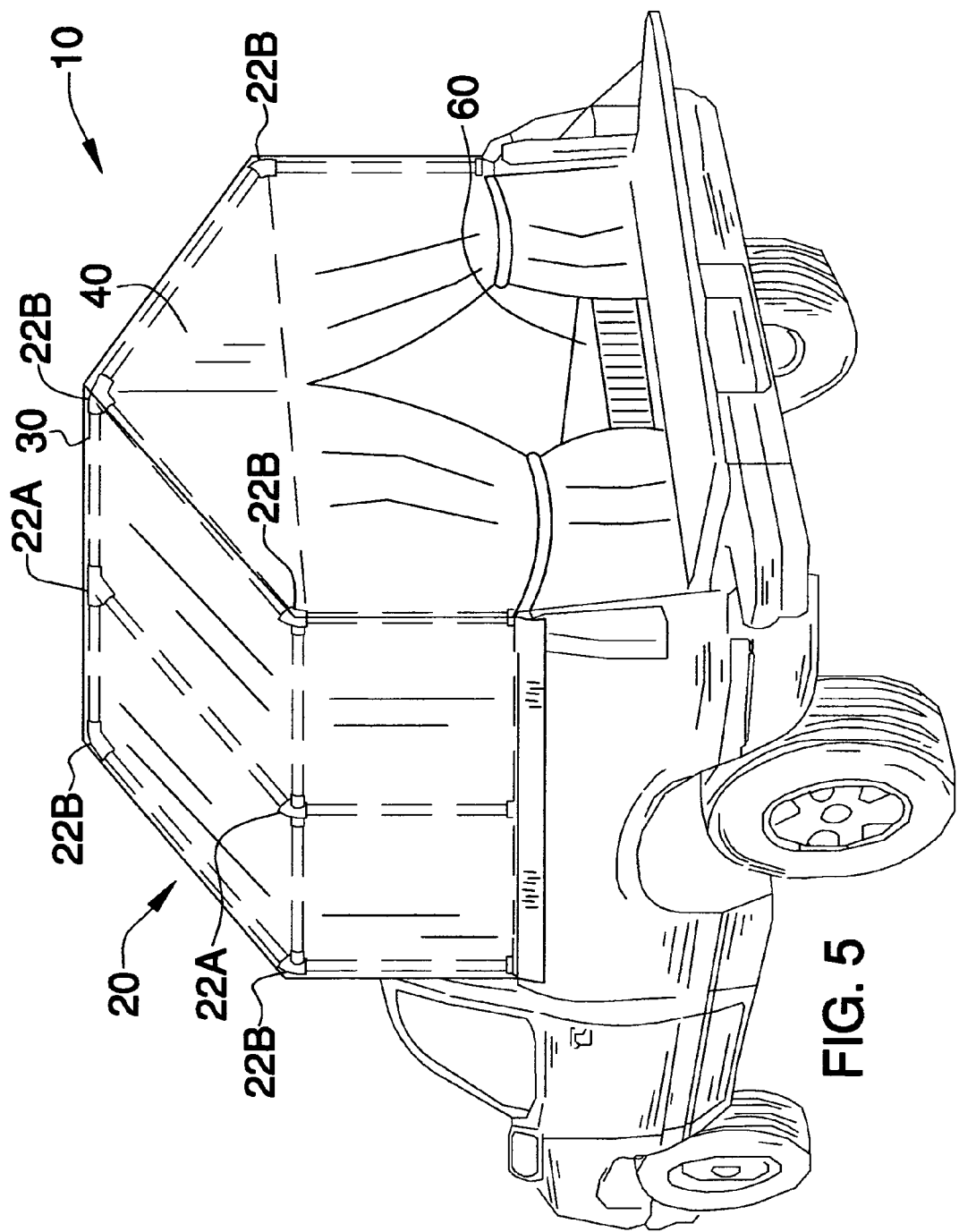
FIG. 5 is a perspective view of the present invention, in a preferred environment.
Figure 6:
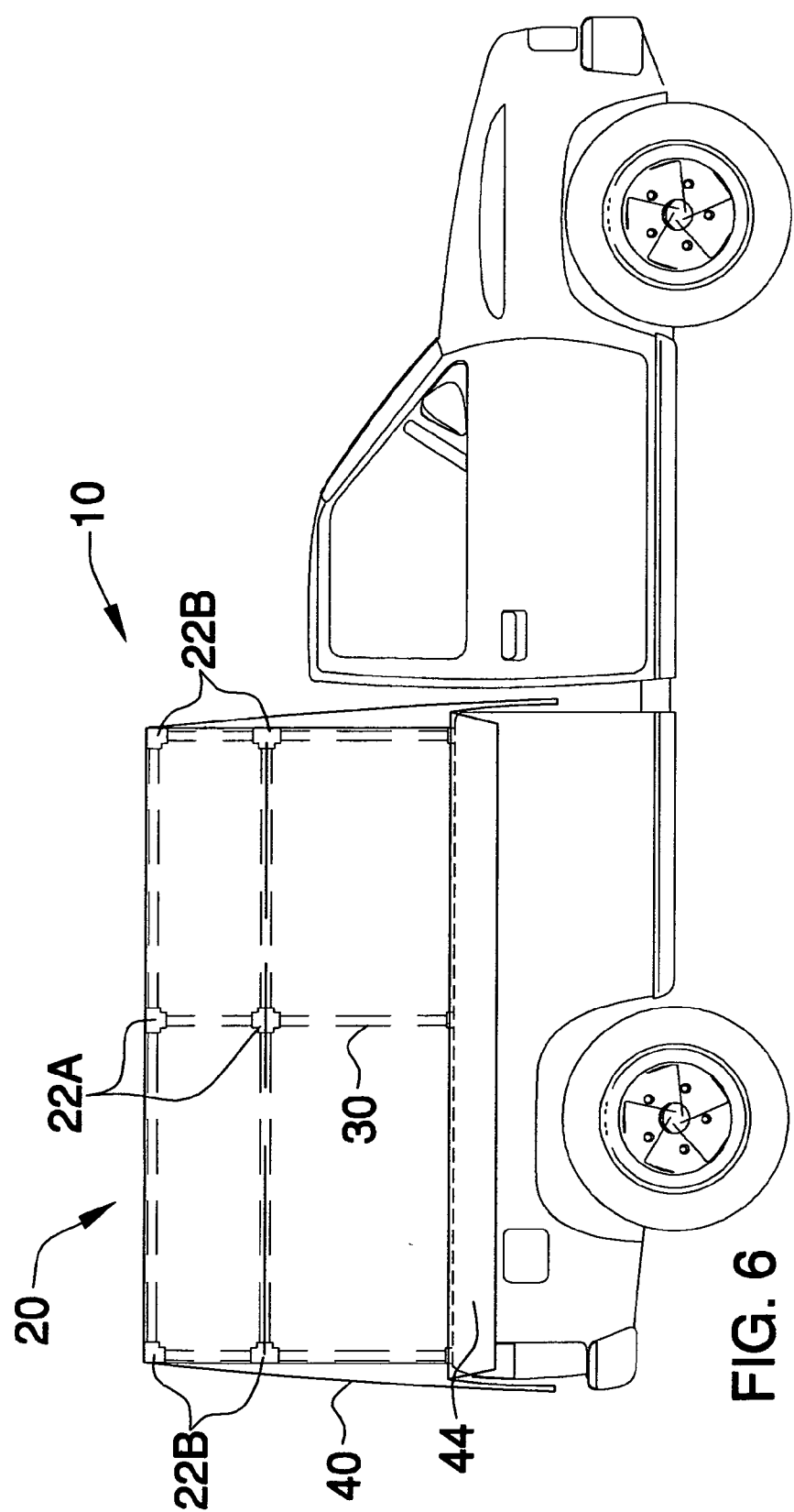
FIG. 6 is a side elevational view of the present invention shown in FIG. 5.
Figure 7:
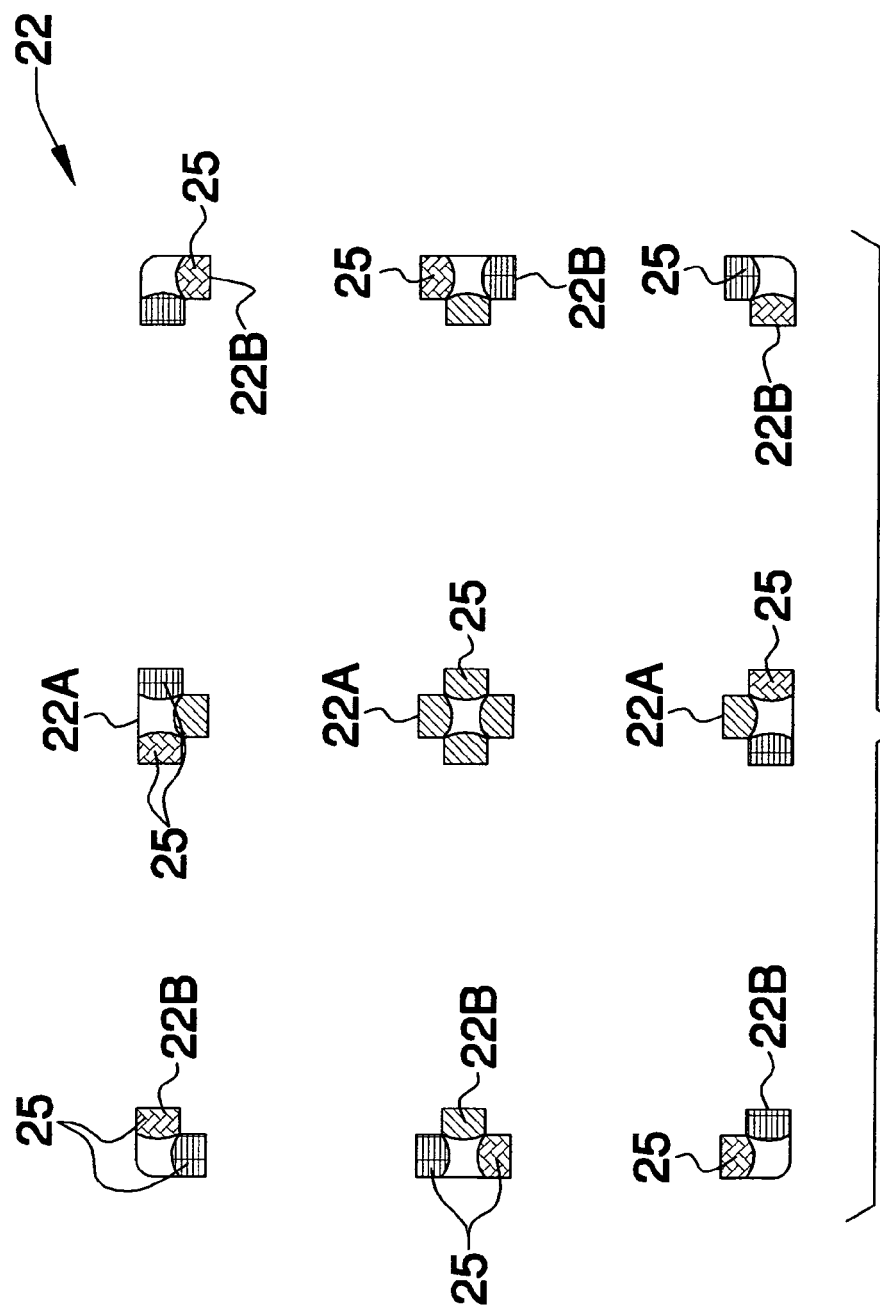
FIG. 7 is a top plan view of the couplings illustrating their respective surface indicia and openings.

Referring to FIG. 7, the couplings 22 are preferably provided with surface indicia 25 such that a user can quickly identify corresponding ones of the couplings 22 during installation procedures and connect associated ones of the tubular support members 21 thereto. Selected ones 22A of the couplings 22 have four axially opposed openings while other ones 22B of the couplings 22 have three obliquely offset openings. Selected ones of the tubular support members 21 may include telescopically engageable male 28 and female 29 end portions for allowing a user to adjust a height of the frame 30 by slidably adapting the selected tubular support members 21 along an axial path, as shown in FIG. 1.

Advantageously, when the tent assembly 10 is no longer needed, it can be easily disassembled and stored until needed again. The mattress 60 is capable of being deflated to a compact state for easier storage. As a result, the tent assembly 10 is ideal for campers, hunters, and other outdoor activities that occur seasonally, and often, on weekends.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A tent assembly mountable onto a flat bed truck, said tent assembly comprising:
    an awning comprising
        a plurality of tubular support members having rectilinear longitudinal lengths, said awning further including a plurality of couplings for interchangeably conjoining said tubular support members such that said tubular support members define a rigid frame,
        means for removably securing said frame to a support surface such that said frame can be maintained at a substantially stable position during operating conditions, and
        a canvas removably positional over said frame for preventing undesirable foreign debris from entering beneath said frame, said canvas being formed from fluid impermeable material and having a plurality of lines of weakness such that said canvas can be readably adapted in such a manner to conform to a shape of said frame, said canvas further having a plurality of lower flange portions extending along a longitudinal length thereof for directing the foreign debris outwardly and away from said frame;
    an inflatable mattress sized and shaped for nesting on the flat bed of the flat bed truck, said inflatable mattress having a corrugated top surface for providing resilient support and equalizing downward forces exerted thereon during sleeping conditions, said mattress including an inlet port and an outlet port juxtaposed thereto; and
    means for selectively inflating said mattress such that a user can introduce and displace air from said mattress as needed during periodic use, said inflating means being detachably engageable with said inlet port.

2. The tent assembly of claim 1, wherein said securing means comprises:
    a plurality of annular brackets centrally secured to bottom end portions of selected ones of said tubular support members, said annular brackets having a pair of diametrically opposed openings formed therein for receiving fastening members therethrough.

3. The tent assembly of claim 1, wherein said securing means comprises:
    a plurality of stakes integrally connected to bottom end portions of selected ones of said tubular support members, said stakes having a converging outer surface terminating subjacent said tubular support member bottom end portions.

4. The tent assembly of claim 1, wherein said couplings are provided with surface indicia such that a user can quickly identify corresponding ones of said couplings during installation procedures and connect associated ones of said tubular support members thereto, selected ones of said couplings having four axially opposed openings while other ones of said couplings have three obliquely offset openings.

5. The tent assembly of claim 1, wherein selected ones of said tubular support members comprise: telescopically engageable male and female end portions for allowing a user to adjust a height of said frame by slidably adapting said selected tubular support members along an axial path.

6. The tent assembly of claim 1, wherein said inflating means comprises:
one implement selected from the group including a manual air-pump and an electrically powered air-pump.

7. A tent assembly mountable onto a flat bed truck, said tent assembly comprising:
an awning comprising
a plurality of tubular support members having rectilinear longitudinal lengths, said awning further including a plurality of couplings for interchangeably conjoining said tubular support members such that said tubular support members define a rigid frame,
means for removably securing said frame to a support surface such that said frame can be maintained at a substantially stable position during operating conditions, and
a canvas removably positional over said frame for preventing undesirable foreign debris from entering beneath said frame, said canvas being formed from fluid impermeable material and having a plurality of lines of weakness such that said canvas can be readily adapted in such a manner to conform to a shape of said frame, said canvas further having a plurality of lower flange portions extending along a longitudinal length thereof for directing the foreign debris outwardly and away from said frame;
an inflatable mattress sized and shaped for nesting on the flat bed of the flat bed truck, said inflatable mattress having a corrugated top surface for providing resilient support and equalizing downward forces exerted thereon during sleeping conditions, said mattress including an inlet port and an outlet port juxtaposed thereto;
wherein said mattress is provided with a pair of oppositely situated indentations monolithically formed therewith such that a pair of wheel wells can be seated therebetween during operating conditions; and
means for selectively inflating said mattress such that a user can introduce and displace air from said mattress as needed during periodic use, said inflating means being detachably engageable with said inlet port.

8. The tent assembly of claim 7, wherein said securing means comprises:
a plurality of annular brackets centrally secured to bottom end portions of selected ones of said tubular support members, said annular brackets having a pair of diametrically opposed openings formed therein for receiving fastening members therethrough.

9. The tent assembly of claim 7, wherein said securing means comprises:
a plurality of stakes integrally connected to bottom end portions of selected ones of said tubular support members, said stakes having a converging outer surface terminating subjacent said tubular support member bottom end portions.

10. The tent assembly of claim 7, wherein said couplings are provided with surface indicia such that a user can quickly identify corresponding ones of said couplings during installation procedures and connect associated ones of said tubular support members thereto, selected ones of said couplings having four axially opposed openings while other ones of said couplings have three obliquely offset openings.

11. The tent assembly of claim 7, wherein selected ones of said tubular support members comprise: telescopically engageable male and female end portions for allowing a user to adjust a height of said frame by slidably adapting said selected tubular support members along an axial path.

12. The tent assembly of claim 7, wherein said inflating means comprises:
one implement selected from the group including a manual air-pump and an electrically powered air-pump.

13. A tent assembly mountable onto a flat bed truck, said tent assembly comprising:
an awning comprising
a plurality of tubular support members having rectilinear longitudinal lengths, said awning further including a plurality of couplings for interchangeably conjoining said tubular support members such that said tubular support members define a rigid frame, said frame having a triangular-shaped apex, said canvas having an elongated slot formed therein, said slot including hook and loop means for allowing a user to securely conjoin opposed portions of said canvas during sleeping conditions;
means for removably securing said frame to a support surface such that said frame can be maintained at a substantially stable position during operating conditions, and
a canvas removably positional over said frame for preventing undesirable foreign debris from entering beneath said frame, said canvas being formed from fluid impermeable material and having a plurality of lines of weakness such that said canvas can be readily adapted in such a manner to conform to a shape of said frame, said canvas further having a plurality of lower flange portions extending along a longitudinal length thereof for directing the foreign debris outwardly and away from said frame;
an inflatable mattress sized and shaped for nesting on the flat bed of the flat bed truck, said inflatable mattress having a corrugated top surface for providing resilient support and equalizing downward forces exerted thereon during sleeping conditions, said mattress including an inlet port and an outlet port juxtaposed thereto;
wherein said mattress is provided with a pair of oppositely situated indentations monolithically formed therewith such that a pair of wheel wells can be seated therebetween during operating conditions; and
means for selectively inflating said mattress such that a user can introduce and displace air from said mattress as needed during periodic use, said inflating means being detachably engageable with said inlet port.

14. The tent assembly of claim 13, wherein said securing means comprises:
a plurality of annular brackets centrally secured to bottom end portions of selected ones of said tubular support members, said annular brackets having a pair of diametrically opposed openings formed therein for receiving fastening members therethrough.

15. The tent assembly of claim 13, wherein said securing means comprises:
a plurality of stakes integrally connected to bottom end portions of selected ones of said tubular support members, said stakes having a converging outer surface terminating subjacent said tubular support member bottom end portions.

16. The tent assembly of claim 13, wherein said couplings are provided with surface indicia such that a user can quickly identify corresponding ones of said couplings during installation procedures and connect associated ones of said tubular support members thereto, selected ones of said couplings having four axially opposed openings while other ones of said couplings have three obliquely offset openings.

17. The tent assembly of claim 13, wherein selected ones of said tubular support members comprise: telescopically engageable male and female end portions for allowing a user to adjust a height of said frame by slidably adapting said selected tubular support members along an axial path.

18. The tent assembly of claim 13, wherein said inflating means comprises: one implement selected from the group including a manual air-pump and an electrically powered air-pump.

* * * * *